Patented June 10, 1952

2,599,526

UNITED STATES PATENT OFFICE 2,599,526

PREPARATION OF SUBSTITUTED PTERIDINES

Donna B. Cosulich, Plainfield, N. J., assignor to American Cyanamid Company, New York, N. Y., a corporation of Maine No Drawing. Application March 8, 1951, Serial No. 214,643

5 Claims. (Cl. 260—251.5)

The present invention relates to a new method of preparing pteroylglutamic acid and related compounds.

Recent medical literature contains numerous references to the use of pteroylglutamic acid, commonly called folic acid, in the treatment of macrocytic anemias, sprue and other conditions of the circulatory system. Pteroylglutamic acid has been prepared in the past by various methods such as the reaction of 2,4,5-triamino-6-hydroxy-pyrimidine and para-aminobenzoylglutamic acid with a dihalopropionaldehyde, a trihaloacetone, etc. Since the availability of the required intermediate will vary in areas and under circumstances, it is important that other available intermediates can be adapted to the preparation of this important vitamin.

I have now found that pteroylglutamic acid and other animoacid amides of pteroic acid can be prepared by reacting 2,4,5-triamino-6-hydroxy-pyrimidine or a salt thereof with a 2-halopropan-1,3,-dial and an aminoacid amide of para-aminobenzoic acid.

The compound 2,4,5-triamino-6-hydroxypyrimidine is known. In the process of the present invention it can be used as such or in one of its tautomeric forms such as 2,4,5-triaminopyrimidone-6 or an acid salt of such compound such as the hydrochloride or sulfate.

The 2-halopropan-1,3-dials are known compounds and have been prepared, for example, from the corresponding tetrahalopropene by reacting the latter with strong sulfuric acid. While 2-bromopropan-1,3-dial, 2-chloropropan-1,3-dial or 2-iodopropan-1,3-dial may be used in the reaction of the present invention, I prefer to use 2-chloropropan-1,3-dial because of its commercial availability and relatively low cost.

The amino acid amides of para-aminobenzoic acid are known compounds. I prefer to use para-aminobenzoylglutamic acid since the final product obtained using this intermediate has the biological activity hereinbefore stated. Other amino acid amides of para-aminobenzoic acid may be used in which the amino acid is glycine, aspartic acid, leucine, alanine, isovaline, cysteine, and the like. The salts and esters of these amino acid amides of para-aminobenzoic acid may also be used in the process.

The reaction to prepare the compounds of the present invention is carried out at a temperature of from about 20° C. to about 100° C. Within the above temperature range the reaction is usually complete within a matter of a few minutes up to one hour.

The reaction of the present invention is preferably carried out in water or a substantially aqueous solution. I may, however, carry out the reaction in a solvent such as a lower aliphatic alcohol, glycol, acetic acid, formic acid or similar organic solvents.

The reactants may be added to each other in any sequence. One method which gives good results is to mix the 2,4,5-triamino-6-hydroxypyrimidine salt with the amino acid amide of para-aminobenzoic acid, followed by the addition of a 2-halopropan-1,3-dial.

In the following example parts are by weight unless otherwise indicated.

A mixture of 2.57 parts of 2,4,5-triamino-6-hydroxypyrimidine sulfate and 2.44 parts of barium chloride dihydrate in 50 parts of water is heated at 50°-70° C. for 5-10 minutes. Then 2.66 parts of para-aminobenzoylglutamic acid is added. After cooling to 40° C. and adding sodium hydroxide to pH 3-4, 1.065 parts of 2-chloropropan-1,3-dial in 10 parts of water and 0.5 parts of sodium dichromate in 10 parts of water are added simultaneously over a 20-minute period. During this time sodium hydroxide is added to maintain pH 3-4. After cooling to 20° C. the precipitate is filtered, washed with water, and dried. The solid contains pteroylglutamic acid as determined in bioassay using *S. faecalis* R.

I claim:

1. A method which comprises reacting together a member of the group consisting of 2,4,5-triamino-6-hydroxypyrimidine and acid salts thereof with a 2-halopropan-1,3-dial and an amino acid amide of para-aminobenzoic acid, whereby an amino acid amide of pteroic acid is produced and recovered.

2. A method which comprises reacting together 2,4,5 - triamino - 6-hydroxypyrimidine, a 2-halopropan-1,3-dial and an amino acid amide of para-aminobenzoic acid in a substantially aqueous solution at a temperature within the range of 0° C. to 100° C., whereby an amino acid amide of pteroic acid is produced and recovered.

3. A method which comprises reacting together 2,4,5 - triamino - 6-hydroxypyrimidine, a 2-halopropan-1,3-dial and para-aminobenzoylglutamic acid, whereby pteroylglutamic acid is produced and recovered.

4. A method which comprises reacting together 2,4,5 - triamino - 6 - hydroxypyrimidine, 2-chloropropan-1,3-dial and para-aminobenzoylglutamic acid, whereby pteroylglutamic acid is produced and recovered.

5. A method which comprises reacting together 2,4,5 - triamino - 6-hydroxypyrimidine sulfate, 2-chloropropan - 1,3 - dial para - aminobenzoylglutamic acid, whereby pteroylglutamic acid is produced and recovered.

DONNA B. COSULICH.

No references cited.